Figure 1:
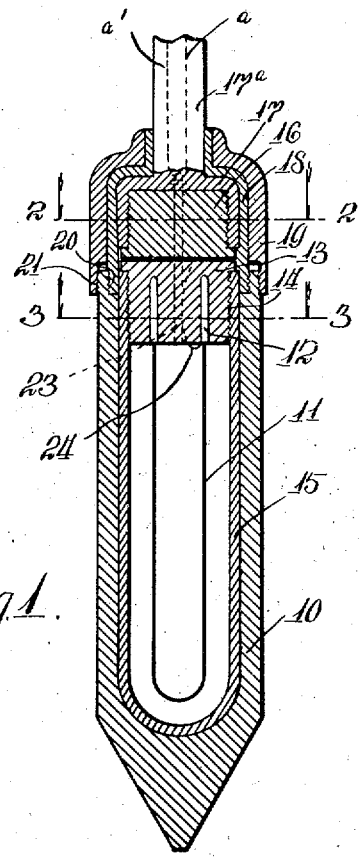

W. G. CLARK.
ELECTRICALLY HEATED TOOL.
APPLICATION FILED JUNE 28, 1909.

961,103.

Patented June 14, 1910.

Witnesses:
Frank L. Stubbs
Arthur G. Darnell

Walter G. Clark, Inventor,
By his Attorney
W. P. Hutchinson.

UNITED STATES PATENT OFFICE.

WALTER G. CLARK, OF NEW YORK, N. Y., ASSIGNOR TO PARKER-CLARK ELECTRIC COMPANY, OF NEW YORK, N. Y., A CORPORATION OF NEW JERSEY.

ELECTRICALLY-HEATED TOOL.

961,103.   Specification of Letters Patent.   Patented June 14, 1910.

Application filed June 28, 1909. Serial No. 504,928.

*To all whom it may concern:*

Be it known that I, WALTER G. CLARK, of the city, county, and State of New York, have invented a new and useful Improvement in Electrically-Heated Tools, of which the following is a full, clear, and exact description.

My invention relates to improvements in electrically heated tools, and in the drawing I have shown the application of my invention to a soldering iron, but the principle is applicable to other forms of tools or devices which are internally heated.

The object of my invention is to produce a simple tool which can be very efficiently and highly heated, and in which the radiation from the heating element or resister is wholly utilized in imparting heat to that portion of the tool which is to be used.

A further object of the invention is to produce a device in which the heating element is easily renewable as well as inexpensive, and further and especially to produce a device in which the heating element is so arranged that the article can be made very small if desired. This is important because in many electrically heated articles the heating element or elements are so arranged that the articles are very bulky. This is especially true of a soldering iron, and this article where heated in the old fashioned way by inserting it in a coal fire, is necessarily very bulky because in such case the mass of the tool must be sufficient to retain the heat for a considerable period or else the tool is very inefficient. With my device, however, that is with my heating appliance, the article can be made as small as desired, and it can be used in a way to do a much nicer job than can be done by the use of the old-fashioned or other bulky form of iron.

My invention also contemplates the use of a highly efficient element or resister made up of a combination of silicon and carbon, and of a protecting but heat conducting sheath which prevents the resister from being accidentally broken, which enables it to be shipped easily, and further which enables it to be readily inserted in or removed from the tool to be heated.

Reference is to be had to the accompanying drawings forming a part of this specification, in which similar reference characters indicate corresponding parts in all the views.

Figure 2:
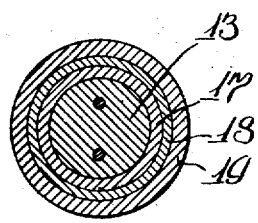
Figure 3:
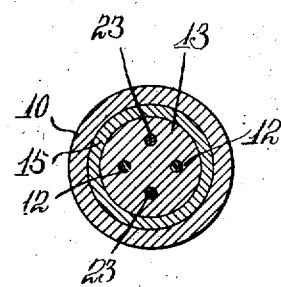

Figure 1 is a longitudinal section of a soldering iron showing my improvements. Fig. 2 is a cross section on the line 2—2 of Fig. 1, and Fig. 3 is a cross section on the line 3—3 of Fig. 1.

The iron 10 is as shown the conventional soldering iron except that it is smaller than usual, but this may be any tool whatever. It is hollow and is heated by a resister or heating element 11 which is in filament form, and has its terminals 12 secured in an insulating block 13, preferably near one end of the tool. As shown in the drawing, the heating element is in U shape, but this shape has nothing to do with the structure and it can be given any desired form, the only thing necessary being to arrange it so that contact can be efficiently made with the element. The only material that I have found to be entirely satisfactory as an internal resister or heater capable of standing a very high temperature, is a combination of silicon and carbon which is brought down by the decomposition of suitable gases. In this case I do not limit myself to the use of the particular resister described, but as stated, this is the only one I know which is entirely satisfactory.

The block 13 can be of any suitable insulating material which will withstand a high heat, and it is preferably screw threaded as shown at 14 into the head of the sheath 15 which covers the resister 11 and protects it from breakage, so that it can be shipped ready to insert in a soldering iron or other tool to be heated. This sheath should be of conducting material, and nickel is well adapted for the purpose. It is obvious that the tool can be heated as well without the intervention of this sheath, but the sheath serves to protect the resister 11 and enables it to be very readily applied without danger of breakage to the soldering iron or other tool. In this connection I wish it understood that any desired number of these elements or resisters 11 can be used in the tool to be heated.

The insulating block 13 abuts with a similar block 16 which forms a part of the base or socket portion of the tool, and which screws into the socket 17 formed on the end of the handle 17ᵃ. The socket 17 is held within a similarly shaped cap 18 which is longer, however, than the socket and longer than the plug 16, and which is concentric with an outer cap 19 the latter being tapped and screw threaded at its lower end as shown at 21, while the former, that is the part 18 is externally screw threaded, and the reduced screw threaded upper end of the iron 10 screws between the two parts 18 and 19 as shown at 20 and 21 in Fig. 1. It will thus be seen that a socket portion is formed in the end of the handle 17ª to which the tool can be easily applied.

The block or plug 16 has contact posts 23 extending through it and up into the handle 17ª, and these posts extend loosely into corresponding holes in the plug or block 13. The posts 23 connect with suitable leading-in wires $a$ and $a^1$, through which the electric current is supplied, and the terminals 12 of the resister 11 have contact springs 24 which extend into the post holes and make contact with the posts 23, so that the current enters through the wire $a$, one of the contact posts 23, the spring 24, the resister 11, a second spring 24, the second contact post 23, and the wire $a^1$ out.

The resister which I use withstands heat in the open air, up to about 1700 deg. C., and so it is not necessary to exhaust the inner part of the tool, and moreover the high internal heat is radiated so that all the heat is practically utilized. The particular connection between the outer end of the tool and its handle can of course be changed indefinitely without changing the principle of the invention, though I have shown a practical scheme for connecting the current and the tool handle to the tool itself, and as already stated, the configuration of the tool and the use to which it is put, is also immaterial, but I do claim specifically the soldering iron shown, and generally the specific heating means for similar tools.

Where it is desired to use the heating unit for a purpose other than a soldering iron, a different outer casing may be substituted—for example, if used as a water heater, the whole resister and insulation is made water tight and placed in the water to be heated. If used in a flat-iron, the resister unit can be mounted in such a way as to be inserted in the flat-iron.

Where the heating unit and sheath are inserted in a tool to heat the latter, the sheath should be for the greater part of its surface in actual contact with the body of the tool, as any air gap is thus eliminated and efficient heating obtained.

Having thus fully described my invention, I claim as new and desire to secure by Letters Patent:—

1. In a tool of the kind described, a heating unit in filament form, a sheath of heat conducting material inclosing the heating unit, said sheath being in actual contact for the greater part of its surface with the tool, insulating material closing one end of the sheath and supporting the heating unit, and electric connections for the heating unit.

2. An electrically heated tool comprising a hollow or chambered head, a sheath of heat conducting material fitting within the head and generally in contact with the head, insulating material held in one end of the sheath, a heating unit in filament form within said sheath and supported in the insulating material, and electrical connections for the heating unit.

3. An electrically heated tool comprising a chambered head, a sheath of heat conducting material within the head and adapted to lie against the inner wall of the head, a heating unit in filament form extending into the sheath, and electrical connections for the filament.

4. An electrically heated tool, comprising a heating unit in filament form which glows in the air, a chambered structure of heat conducting material inclosing the filament and arranged to receive unobstructed the heat radiated by the filament, and electrical connections for the filament.

5. In a device of the kind described, a protective sheath which is a good conductor of heat, a heating unit in filament form which glows in the air on the passage of an electric current through it, said filament extending into the sheath, and electrical connections for the filament.

WALTER G. CLARK.

Witnesses:
WARREN B. HUTCHINSON,
FRANK L. STUBBS.